US006808769B2

(12) United States Patent
Batz-Sohn et al.

(10) Patent No.: US 6,808,769 B2
(45) Date of Patent: Oct. 26, 2004

(54) DISPERSION, COATING COMPOSITION, AND RECORDING MEDIUM

(75) Inventors: Christoph Batz-Sohn, Hanau (DE); Thomas Scharfe, Alzenau (DE); Wolfgang Lortz, Waechtersbach (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/394,248

(22) Filed: Mar. 24, 2003

(65) Prior Publication Data

US 2004/0025746 A1 Feb. 12, 2004

(30) Foreign Application Priority Data

Mar. 22, 2002 (DE) .......................................... 102 12 679
Mar. 22, 2002 (DE) .......................................... 102 12 677

(51) Int. Cl.$^7$ ............................. B41M 5/00; B32B 9/04; C01B 33/14; C01B 33/141; B05D 3/02
(52) U.S. Cl. ................. 428/32.37; 428/32.1; 428/32.34; 428/32.36; 428/332; 428/446; 428/688; 428/702; 427/372.2; 106/286.1; 106/286.8; 106/400; 516/77; 516/78; 516/79; 516/80; 516/86
(58) Field of Search ................................ 428/445, 688, 428/702, 332, 32.1, 32.34, 32.36, 32.37; 516/77, 78, 80, 86; 427/372.2; 106/286.1, 286.8, 400

(56) References Cited

U.S. PATENT DOCUMENTS

| 5,858,813 A | * | 1/1999 | Scherber et al. ............ 438/693 |
| 6,284,819 B1 | | 9/2001 | Darsillo et al. |
| 6,420,039 B1 | * | 7/2002 | Field et al. ................. 428/451 |
| 2002/0007685 A1 | | 1/2002 | Kunz et al. |

FOREIGN PATENT DOCUMENTS

| DE | 100 35 054 | 10/2001 |
| EP | 0 879 709 | 11/1998 |

* cited by examiner

Primary Examiner—Philip C. Tucker
Assistant Examiner—Michael J Feely
(74) Attorney, Agent, or Firm—Oblon, Spivak, McClelland, Maier & Neustadt, P.C.

(57) ABSTRACT

The present invention provides an aqueous dispersion containing at least two powder types selected from one or more metal oxide powders and/or one or more non-metal oxide powder. The present invention also provides a coating composition containing this dispersion, an inkjet recording medium containing the coating composition, and methods of making the same.

23 Claims, 2 Drawing Sheets

DISPERSION, COATING COMPOSITION, AND RECORDING MEDIUM

CROSS REFERENCE TO RELATED CASES

The present application claims priority to German Application No. DE 102 12 677.1, filed on Mar. 22, 2002, and German Application No. 102 12 679.8, filed on Mar. 22, 2002, both of which are hereby incorporated by reference in their entirety.

BACKGROUND OF THE INVENTION

1. Field of the Invention

The present invention provides an aqueous dispersion containing at least two powder types selected from one or more metal oxide powders and/or one or more non-metal oxide powder. The present invention also provides a coating composition containing this dispersion, an inkjet recording medium containing the coating composition, and methods of making the same.

2. Discussion of the Background

In order to improve the print properties of the surfaces of absorptive supports, recording media may be coated with a coating composition. The particularly important print properties to be improved include: adsorption, drying time, ink adhesion, and recording medium glossiness. For photograph-type materials glossiness and high ink absorption capacity are of particular importance.

In general, the coating composition utilized to produce a glossy absorptive support contains an aqueous dispersion of pigments (e.g., hydrated aluminium hydroxide, aluminium oxide, silicon dioxide (silica), and/or titanium dioxide) and a binder (e.g., polyvinyl alcohol), whereby the pigments are incorporated in the form of powders or as a dispersion of powders.

High-gloss coatings are often obtained by employing fine silica particles. However, the dispersions used for these coating compositions often have low stabilities and high viscosities. Accordingly, the dispersion often has to be produced immediately before being used in a coating composition. Due to increased viscosities, more highly filled dispersions are difficult to process.

The filler content used in the coating composition is an important parameter for controlling the quality of the recording medium and for the economic efficiency of the ink recording processes. As the filler content in the coating composition increases, the amount of the coating composition needed to obtain a specific rate of application decreases. In addition, less water has to be evaporated with a high filler content, which leads to faster drying. Accordingly, the process can be performed more economically than with a coating composition having a low filler content.

A high gloss and a good ink absorption capacity can also be achieved through processing if the coating composition is applied by cast coating. However, this process is relatively slow and cost-intensive.

In DE-A-100 35 054 cationised fine silica particles with a primary particle diameter of 50 nm or less are used in an aqueous dispersion to produce a coating composition that gives rise to a recording medium with high gloss and good ink absorption capacity.

U.S. Pat. No. 6,284,819 describes a coating composition with a specific viscosity that is obtained from an aqueous dispersion of two particles differing in type and size. The first powder type comprises metal oxide particles such as silica, cationised silica or aluminium oxide. The particle size is defined in that the first powder type comprises aggregates of smaller primary particles having an average primary particle size of less than 100 nm and an average aggregate size of 100 to 500 nm. The second powder type comprises metal oxides and synthetic polymers. The average aggregate diameter of the particles in the second powder type is at least half the size of the average aggregate diameter of the first powder type. The ratio by weight of the particles of the first to the second powder type is between 9 and 91 wt. %.

By employing this coating composition, a recording medium with high gloss and good ink absorption capacity can be produced. The first powder type of particles should be responsible for the absorption of liquid. The smaller aggregates of the second powder type should fill voids. Overall the packing density of the coating is increased. The substantial feature is that the average aggregate diameter of the particles of the second powder type is at least half the size of the average aggregate diameter of the first powder type.

As is shown in the embodiment examples, the coating composition is obtained by adding a binder, such as polyvinyl alcohol, to a physical mixture of two aqueous dispersions, one dispersion containing the particles of the first powder type, one dispersion containing the particles of the second powder type. All combinations of metal oxide particles, regardless of their specific surface charge, at a specific pH of the dispersion are disclosed in U.S. Pat. No. 6,284,819. However, this combination can lead to dispersions that are not stable and that rapidly gel. Therefore, the coating compositions of U.S. Pat. No. 6,284,819 are only of limited suitability for production of a coating composition.

Accordingly, there remains a critical need for coating compositions and absorptive media produced using these coating compositions that have high glossiness, good ink absorption capacity and rapid drying times. Of particular importance are dispersions that serve as the starting material for these coating compositions.

SUMMARY OF THE INVENTION

Accordingly, it is an object of the present invention to provide a dispersion with a high filler capacity and low viscosity. It is also an object of the present invention to provide a coating composition containing these dispersions that, when applied to an absorptive support, produces a recording medium having a high gloss, good ink absorption capacity and good drying performance.

The present inventors have found that the object of the present invention is achieved by using a stable, aqueous dispersion containing 20 to 80 wt. %, relative to the total amount of dispersion, of one or more metal oxide and/or non-metal oxide powders, which are present in the dispersion in the form of aggregates of primary particles,
whereby the average diameter of the aggregates is 10 nm to 300 nm and
the average diameter of the primary particles is 5 to 50 nm, wherein the dispersion contains at least two types of powder,
whereby the powder types at a given pH of the dispersion display the same surface charge sign;
have a zeta potential that gives rise to an electrostatic repulsion between the particles that is greater than the van der Waals attraction between the powders;
the average diameter of the primary particles differs by a factor of at least 1.5 between two powder types;

in the dispersion the average aggregate diameter of the second and additional powder types displays 60 to 150% of the size of the first powder type; and each powder type is present in the dispersion in a quantity of at least 1 wt. %.

In an embodiment of this object of the invention, two types of powder are present. Further, any powder(s) present may be produced by flame hydrolysis.

In another embodiment of this object of the invention, the weight ratio of the first powder type to the second powder type in the dispersion is 10:90 to 90:10.

In another embodiment of this object of the invention, the average primary particle diameters of the powder types in the dispersion differ by a factor of at least 2.

In still another embodiment of this object of the invention, the average aggregate diameter of the second and additional powder types in the dispersion is 80 to 120% of the size of the first powder type.

In an embodiment of this object of the invention, the viscosity of the dispersion does not exceed a value of 1500 mPas at a shear rate of 12 s$^{-1}$ and a temperature of 23° C.

In yet another embodiment of this object of the invention, the dispersion may also contain one or more substances to adjust the pH (such as an acid, a base, and a buffer system) and/or one or more additives selected from the group consisting of a salt, a surface-active substance, an organic solvent, a bactericide and a fungicide.

In other objects of the present invention are process for the production of the inventive dispersion, coating compositions containing the inventive dispersion, methods of making the coating composition, a recording medium containing the coating composition, and methods of making the recording medium.

The above objects highlight certain aspects of the present invention. Additional objects, aspects and embodiments of the present invention are found in the following detailed description of the present invention.

BRIEF DESCRIPTION OF THE FIGURES

A more complete appreciation of the present invention and many of the attendant advantages thereof will be readily obtained as the same becomes better understood by reference to the following Figures in conjunction with the detailed description below.

An absolute explanation of the excellent properties of the dispersion and coating composition according to the present invention cannot be provided at present. However, FIGS. 1 and 2 provide a possible interpretation.

FIG. 1 corresponds to the facts described in U.S. Pat. No. 6,284,819. FIG. 1 clearly shows the high filler content of the dispersion, which has a negative influence on the pore volume, however, leading to poorer image properties.

DETAILED DESCRIPTION OF THE INVENTION

Figure 1:
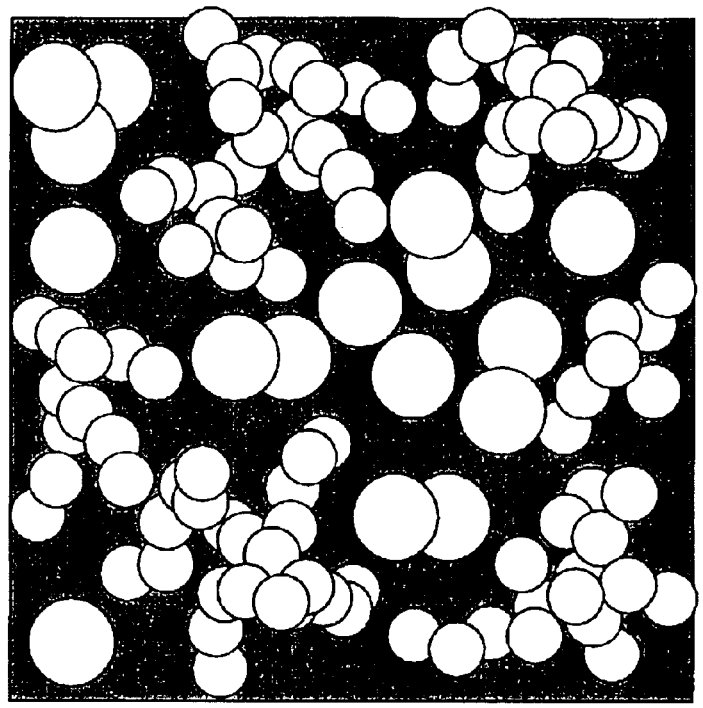
FIG. 1 shows an arrangement of two aggregates having primary particles of different sizes in a dispersion. The aggregates with the lower BET surface area have a diameter that is half the size of that of the aggregates with the smaller BET surface area.
Figure 2:
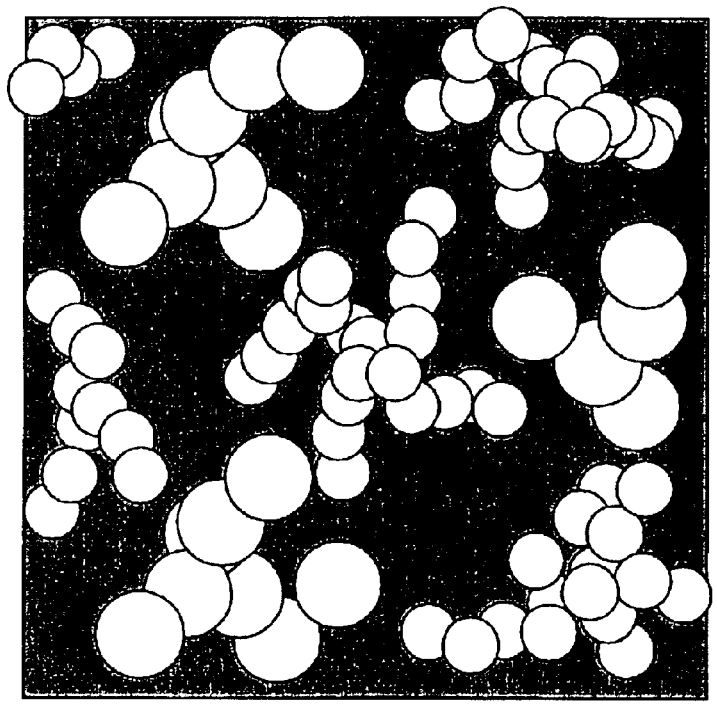
FIG. 2 shows a situation in the dispersion according to the present invention with two types of aggregates, whereby both types have the same aggregate size albeit with different primary particle sizes. Large pores are formed with a high filler content.

Unless specifically defined, all technical and scientific terms used herein have the same meaning as commonly understood by a skilled artisan in inkjet recording media and materials chemistry.

All methods and materials similar or equivalent to those described herein can be used in the practice or testing of the present invention, with suitable methods and materials being described herein. All publications, patent applications, patents, and other references mentioned herein are incorporated by reference in their entirety. In case of conflict, the present specification, including definitions, will control. Further, the materials, methods, and examples are illustrative only and are not intended to be limiting, unless otherwise specified.

The present invention is based in part on the Inventor's surprising discovery that the object of the present invention is achieved by using a stable, aqueous dispersion containing 20 to 80 wt. %, relative to the total amount of dispersion, of one or more metal oxide and/or non-metal oxide powders, which are present in the dispersion in the form of aggregates of primary particles, whereby the average diameter of the aggregates is 10 nm to 300 nm and the average diameter of the primary particles is 5 to 50 nm, wherein the dispersion contains at least two types of powder, whereby the powder types at a given pH of the dispersion display the same surface charge sign;

have a zeta potential that gives rise to an electrostatic repulsion between the particles that is greater than the van der Waals attraction between the powders;

the average diameter of the primary particles differs by a factor of at least 1.5 between two powder types;

in the dispersion the average aggregate diameter of the second and additional powder types displays 60 to 150% of the size of the first powder type; and each powder type is present in the dispersion in a quantity of at least 1 wt. %.

The "primary particles" in the inventive powders are understood to be the smallest particles that are visible in high-resolution TEM images, which can not be broken down any further. Several primary particles can congregate at their points of contact to form aggregates. These aggregates are either impossible or very difficult to break down using dispersing devices. Several aggregates can join together loosely to form agglomerates, whereby this process can be reversed again by placing the agglomerates in a suitable dispersion.

The "average aggregate diameter" is understood to refer to the equivalent sphere diameter, stated as the volume-weighted median value from peak analysis. For the powders, the average aggregate diameter is calculated by dynamic light scattering. A suitable instrument for dynamic light scattering is a Malvern Zetasizer 3000 HSa device. If several powders are present in a dispersion, which have separately measured average aggregate diameters that differ in size by 60 to 150%, a monomodal distribution will be observed by dynamic light scattering. In other words, the average aggregate diameters of a powder consisting of several types of powders are measured as being of the same size if their diameters differ by 60% to 150%. If the average aggregate diameters of two powders in a dispersion differ by less than 60% or by more than 150%, when measured separately, the light scattering displays a bimodal distribution of the powder mixture. As such, the aggregate diameters resulting in a bimodal distribution lie outside the claimed range.

"Stable" is understood to mean that the dispersion does not precipitate out over a period of at least one month and forms no bottom products. This also means that the dispersion can be transported and does not have to be produced immediately before use.

"Aqueous" is understood to mean that the main component of the liquid phase is water.

In order to obtain a stable dispersion it is important that the particles present in the dispersion have the same surface charge, because particles having the same surface charge will repel one another. The zeta potential is a measure of the surface charge of the particles. It represents the potential at the shear level within the electrochemical double layer of metal oxide and/or non-metal oxide particles and electrolyte in the dispersion. The zeta potential depends inter alia on the type of particle, for example silicon dioxide, cationised silicon dioxide or aluminium oxide. If the zeta potential is sufficiently high, the repulsive force can overcome the van der Waals attraction between the powder particles and coagulation or sedimentation of the particles is avoided. An example of how the zeta potential can be determined includes measuring the colloid vibration current (CVI) of the dispersion or by determining the electrophoretic mobility.

An important parameter in connection with the zeta potential is the isoelectric point (IEP) for a particle. The IEP indicates the pH at which the zeta potential is zero. In aluminium oxide or cationised silicon dioxide the IEP is at a pH of approximately 9 to 10, in silicon dioxide it is below pH 3.8.

The charge density at the surface can be influenced by changing the concentration of the potential-determining ions in the surrounding electrolyte. In dispersions where the particles are acid or basic powder types at the surface, the charge can be changed by adjusting the pH. The greater the difference between pH and IEP, the more stable the dispersion.

There is no limit to the number of types of powder that may be present in the dispersions of the present invention. Preferably, two powder types are used. These two powder types preferably are present in a weight ratio of powder type 1 to powder type 2 of 10:90 to 90:10.

In a preferred embodiment the average primary particle diameters of the powder types differ by a factor of at least 2. In a particularly preferred embodiment, the average primary particle diameters differ by a factor of at least 2.5.

In a particular embodiment, the average aggregate diameter of the second and additional powder types is 80 to 120% of the size of the first powder type. In another particular embodiment, the aggregate diameter of the powder types is an approximately equal size.

The metal and/or metal oxide powders according to the present invention include silicon dioxide, aluminium oxide, titanium dioxide, cerium oxide and zirconium oxide. The surfaces of these powders display acid or basic centres. There is no restriction on the source of the metal and non-metal oxides. Metal and non-metal oxides produced by flame hydrolysis are preferably used for the dispersion according to the present invention. Silicon dioxide and aluminium oxide produced by flame hydrolysis are particularly preferred.

"Flame hydrolysis" is understood to mean the hydrolysis of metal or non-metal compounds in the gas phase of a flame, generated by the reaction of a fuel gas, preferably hydrogen, and oxygen. Highly disperse, non-porous primary particles are initially formed which, as the reaction continues, coalesce to form aggregates, and these aggregates may congregate further to form agglomerates. In a preferred embodiment, the BET surface area of these primary particles is 5 to 600 $m^2/g$.

Silicon dioxide produced by flame hydrolysis can also be used in a cationised form, which may be achieved by treating the silicon dioxide powder produced by flame hydrolysis with a cationic polymer that is soluble in the dispersion medium. A polymer having a weight average molecular weight of below 100,000 g/mol is preferably be used. A polymer having a weight average molecular weight of 2000 to 50,000 g/mol is particularly preferred.

The cationic polymers used in the present invention may be polymers having at least one of the following: a quaternary ammonium group, a phosphonium group, an acid adduct of a primary, secondary or tertiary amine group, a polyethylene imine, a polydiallyl amine, a polyallyl amine, a polyvinyl amine, a dicyandiamide condensate, a dicyandiamide-polyamine cocondensate, or a polyamide-formaldehyde condensate.

Those deriving from a diallyl ammonium compound are preferably used. Particularly preferable are those deriving from a dialkyl diallyl compound, which can be obtained by a radical cyclisation reaction of diallyl amine compounds and display the structure 1 or 2.

Structures 3 and 4 represent copolymers deriving from dialkyl diallyl compounds.

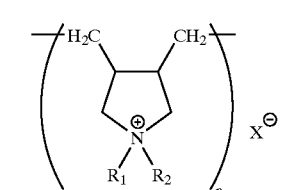

1

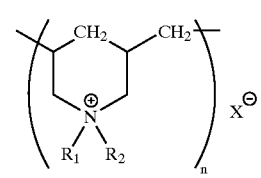

2

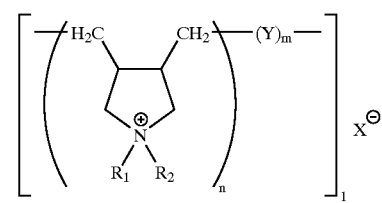

3

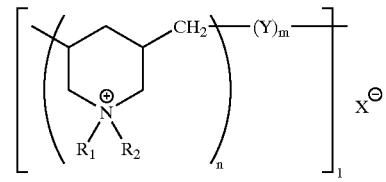

4

$R_1$ and $R_2$ represent a hydrogen atom, an alkyl group having 1 to 4 C atoms, a methyl, an ethyl, an n-propyl, an iso-propyl, an n-butyl, an iso-butyl or a tert.-butyl group, whereby $R_1$ and $R_2$ can be the same or different. A hydrogen atom from the alkyl group can also be substituted by a hydroxyl group. Y represents a radical-polymerisable monomer unit, such as sulfonyl, acrylamide, methacrylamide, acrylic acid, methacrylic acid. $X^-$ represents an anion.

A poly(diallyl dimethyl ammonium chloride) solution (PDADMAC solution in water) can be cited by way of example.

The content of the cationic polymer can be 0.1 to 15 wt. %, preferably 0.5 to 10 wt. %, particularly preferably 0.8 to 5 wt. %, relative to the amount of cationic polymer and silicon dioxide powder.

In an advantageous further development of the present invention at least one powder type can be a mixed oxide powder. Powders of at least two oxides selected from the group consisting of silicon dioxide, aluminium oxide, titanium dioxide, cerium oxide and zirconium oxide may be used as mixed oxide powders.

"Mixed oxide" is understood to mean the intimate mixture of oxide powders at an atomic level with formation of mixed oxygen-metal/non-metal bonds, such as Si—O—Al or Si—O—Ti. The primary particles can additionally display regions in which the oxide powders are present side by side, for example regions of silicon dioxide adjacent to aluminium oxide.

Mixed oxide powders produced by flame hydrolysis are preferably used. In this connection, the precursor substances of the mixed oxides, separately or together, are transferred to a burner where they are burned in a flame, and the mixed oxide powders that are produced are separated off. The production of these powders is described for example in EP-A-585 544, DE-A-199 19 635 (both SiO2-Al2O3 mixed oxides) or DE-A-4235996 (SiO2-TiO2 mixed oxide).

The present invention also comprises doped metal or non-metal oxides produced by the method described in DE-A-19650500. In particular the silicon-aluminium mixed oxide described in DE-A-198 47 161.

The present invention also comprises powders having a metal or non-metal oxide as a core, which is entirely or partially sheathed by a different metal or non-metal oxide. The sheath can be applied in a liquid medium or by means of a deposition process from a vaporous precursor of the metal or non-metal oxide.

In an advantageous embodiment the viscosity of the dispersion according to the present invention can be below a value of 1500 mPas at a shear rate of 12 $s^{-1}$ and a temperature of 23° C. Values below 1000 mPas at a shear rate of 12 $s^{-1}$ and a temperature of 23° C. are particularly preferable.

The dispersion according to the present invention may also contain substances to adjust the pH (such as acids, bases or buffer systems) and additives to stabilise the dispersion (such as salts, surface-active substances, or organic solvents), bactericides and/or fungicides.

The present invention also provides a process for production of the dispersion according to the present invention. In this process the powder types are dispersed separately in an aqueous dispersion by means of a dispersing device and then combined. In an alternative process the powder types are first physically mixed and then dispersed together, or the powder types are introduced into the dispersing device in portions and then dispersed together. A predispersion may optionally be performed prior to dispersion.

High-speed mixers or a toothed disc are suitable examples of devices for forming a predispersion. Rotor-stator machines, such as Ultra Turrax (IKA) or those manufactured by Ystral, as well as ball mills and attrition mills, are suitable for making a dispersion. Higher energy inputs are possible with a planetary kneader/mixer. The efficiency of this system depends on a sufficiently high viscosity of the mixture to be processed, and to obtain the high shear energies needed to break down the particles to be introduced.

Aqueous dispersions having average aggregate diameters of less than 100 nm may be obtained with high-pressure homogenisers. In these devices two predispersed streams of suspension under high pressure are decompressed through a nozzle. The two dispersion jets hit each other exactly and thereby the particles grind themselves together.

In another embodiment the predispersion is again placed under high pressure, but the particles collide against armoured sections of wall. The operation may be repeated any number of times to obtain smaller particle sizes.

The present invention also provides a coating composition containing the dispersion according to the present invention and at least one hydrophilic binder.

As a hydrophilic binder, polyvinyl alcohol, partially or entirely saponified, and cationised polyvinyl alcohol with a primary, secondary or tertiary amino group or a tertiary ammonium group on the main chain or on the side chain may be used. Combinations of one or more polyvinyl alcohols as well as with one or more other binders selected from polyvinyl pyrrolidones, polyvinyl acetates, silanised polyvinyl alcohols, styrene-acrylate latices, styrene-butadiene latices, melamine resins, ethylene-vinyl acetate copolymers, polyurethane resins, synthetic resins such as polymethyl methacrylates, polyester resins (for example unsaturated polyester resins), polyacrylates, modified starch, casein, gelatine and/or cellulose derivates (for example carboxymethyl cellulose) may also be used. Polyvinyl alcohol or cationised polyvinyl alcohol is preferably used as a binder.

The coating composition may also contain one or more additional pigments such as calcium carbonates, phyllosilicates, aluminium silicates, plastics pigments (for example polystyrene, polyethylene, polypropylene), silicas (for example colloidal silicas, precipitated silicas, silica gels, cationised modifications of the cited silica compounds), aluminium compounds (for example aluminium sols, colloidal aluminium oxides and hydroxyl compounds thereof, such as pseudoboehmites, boehmites, aluminium hydroxide), magnesium oxide, zinc oxide, zirconium oxide, magnesium carbonates, kaolin, clay, talc, calcium sulfate, zinc carbonate, satin white, lithopones, zeolites.

The coating composition may have a metal oxide powder and/or non-metal oxide powder content of 10 to 60 wt. %. Preferably the content of these powders is greater than 15 wt. %, particularly preferably greater than 25 wt. %.

The coating composition may also contain an amount of binder, relative to the metal oxide and/or non-metal oxide powders, of 3 to 150 wt. %. Preferably the binder content is 10 to 40 wt. %, particularly preferably 3 to 15 wt. % with respect to the metal oxide and/or non-metal oxide powder content.

Crosslinking agents such as zirconium oxides, boric acid, melamine resins, glyoxal and isocyanates and other molecules which link together the molecule chains of the binder system may be used to increase the water resistance of the binder system and hence of the coating.

In addition, auxiliary substances such as optical brighteners, defoaming agents, wetting agents, pH buffers, UV absorbers and viscosity aids may be used.

The present invention also provides the production of the coating composition by adding the dispersion according to the present invention, by stirring, to an aqueous solution of a hydrophilic binder, to which additional additives may optionally be added, and optionally diluted, until the desired ratio of metal oxide and/or non-metal oxide powder and binder and the desired total solid content is established. The addition sequence is not substantial. Stirring is optionally continued for a certain period of time and deaeration is then performed in vacuo if required. Additives are understood to include: pigment, crosslinking agents, optical brighteners, defoaming agents, wetting agents, pH buffers, UV absorbers and viscosity aids.

The present invention also provides an ink-absorptive coating using the coating composition according to the present invention and a support. Examples of supports that may be used include: paper, coated paper, resin films (such as a polyester resin, including polyethylene terephthalate, polyethylene naphthalate, a diacetate resin, a triacetate resin, an acrylic resin, a polycarbonate resin, a polyvinyl chloride, and a polyimide resin), cellophane, celluloid and a glass plate.

So-called photographic base paper, i.e. papers to which one/or more layers of polyethylene film have been applied to the front and or back, are preferred. Also polyester film, PVC film or precoated papers may be used.

The recording medium according to the present invention also includes media in which the ink-absorptive coating consists of several coating layers of the same type or other layers. The coating composition according to the present invention may be in only one or in several layers. Thus for example additional ink-absorptive coatings, such as films containing precipitated silica, may also be applied underneath the coating composition according to the present invention. One or more polymer layers (for example polyethylene) can also be applied to the substrate and/or to the coating according to the present invention, in order to increase the mechanical stability and/or the gloss in the coating (for example photographic base paper, lamination).

The supports may be transparent or opaque. There is no limit to the thickness of the support, but thicknesses of 50 to 250 μm are preferred.

The present invention also provides the production of a recording medium wherein the coating composition is applied to the support and dried. The coating composition can be applied by all conventional application processes, including roll coating, blade coating, airbrush, doctor blade (profiled, smooth, slotted), cast coating, film press, size press, curtain coating and slot die application (such as a casting blade) and combinations thereof. Processes that allow a very homogeneous coating, such as cast coating, curtain coating and slot die application, are preferably used.

The coated substrate can be dried by all conventional methods, such as air drying or convection drying (e.g. hot air passage), contact or conduction drying, energy radiation drying (for example infrared and microwave).

It is surprising that the dispersions according to the present invention display a high filler content with low viscosity and that the coating compositions produced with them display a high gloss.

In U.S. Pat. No. 6,284,819 a coating composition is obtained from an aqueous dispersion containing two powder types of aggregates, whereby the aggregate diameters of the first powder type are at least 50% smaller than those of the second-powder type. The aggregate diameters of the second powder type are preferably substantially even smaller, for example below 20 nm. The powder type with the larger aggregate diameters is supposed to be responsible for the absorption of liquid, the smaller aggregate diameters of the second powder type are supposed to fill voids. Overall the packing density of the coating is increased.

On the other hand, in the dispersion and coating composition according to the present invention the differences in aggregate diameters in the individual powder types, in contrast to U.S. Pat. No. 6,284,819, must be no less than 60% of the larger aggregates. It is particularly preferable for the diameter of the aggregates to be the same.

Having generally described this invention, a further understanding can be obtained by reference to certain specific examples, which are provided herein for purposes of illustration only, and are not intended to be limiting unless otherwise specified.

EXAMPLES

Analytical Methods

The viscosity of the dispersions was determined using an MCR300 device with measuring system CC27 from Parr-Physica, whereby measurements were taken at shear rates of between 0.01 and 100 s$^{-1}$. The viscosity was reported at 12 s$^{-1}$ and 23° C. The viscosity of the coating compositions was measured with a Brookfield RVT rotary viscometer at 100 s-1 and 23° C.

The zeta potential was determined with a DT-1200 device from Dispersion Technology Inc. using the CVI method.

The particle aggregate size was determined by dynamic light scattering using the Zetasizer 3000 HSa device (Malvern Instruments, UK). Accordingly, the volume-weighted median value from peak analysis was obtained.

The average primary particle sizes of the powders used were determined by transmission electron microscopy (TEM).

Powders

Pyrogenically produced silicon dioxides (Aerosil®) and pyrogenically produced aluminium oxides (VP Alu) from Degussa AG, colloidally produced silicon dioxide (Ludox®) from DuPont and silicon-aluminium mixed oxides (MOX, DOX) from Degussa AG were used as powders (see Table 1).

Dispersions

Analytical data for the dispersions is set forth in Table 2.

Demineralised water was used as the dispersion medium for the cited examples. Polyquat 40U05NV from Katpol GmbH, with a content of the active ingredient poly-DADMAC of 40 wt. %, was used as a cationisation agent for the silica dispersions.

For large-scale dispersion the Conti-TDS 3 inline disperser from Ystral was used. This rotor-stator system was operated at 3000 rpm according to standard protocol.

Laboratory dispersions were produced using an Ultra-Turrax XY from IKA, at 7000 rpm ("UT"). Markedly higher shear energies were achieved in individual cases (see dispersions 2 and 10) with the Ultimaizer HJP-25050 wet jet mill from Sugino, Japan. In this jet mill, 0.3 mm diamond dies were used at pressures of up to 2500 bar. The predispersion required for this machine was produced with the Conti-TDS.

Dispersion 1 (D1) (comparative example): Aerosil® 200 and cationic polymer, low shear energy 2.4 kg of Polyquat were dissolved in 31.7 kg of water. Subsequently, 7.7 kg of Aerosil® 200 were dispersed within 25 minutes of dissolving the Polyquat in water via the suction nozzle of the Conti-TDS. The dispersion was redispersed for a further 5 minutes. The resulting dispersion was viscous with a solid content of 18.4 wt. %. No further powder can be introduced to the dispersion. As a result of the high viscosity, this dispersion was unsuitable for the production of coating compositions.

Dispersion 2 (D2) (comparative example): Aerosil® 200 and cationic polymer, high shear energy The dispersion D1 was subjected to additional shearing at 1000 bar with the aid of the wet jet mill. The viscosity decreases sufficiently so as to permit introduction of an additional 2.3 kg of Aerosil® 200 using the Conti-TDS, thereby giving rise to a solid content of 22.6 wt. %. Finally the dispersion was sheared once at 2000 bar in the Ultimaizer. The solid content cannot be increased any further.

Dispersion 3 (D3) (comparative example): Aerosil® 130 and cationic polymer, low shear energy 25.4 g of Polyquat were dissolved in 1085 g of water and 390 g of Aerosil® 130 was introduced under shear conditions (UT). Redispersion was performed for 30 minutes. A solid content of 26 wt. % was obtained. No further increase in the solid content was possible. As a result of the high viscosity, this dispersion was unsuitable for the production of coating compositions Dispersion 4 (D4) (comparative example): Aerosil® 130, Aerosil® 200 and cationic polymer 30.0 g of Polyquat were dissolved in 1110 g of water. 180 g of Aerosil® 130 and 180 g of Aerosil® 200 were then alternately introduced in small portions under shear conditions (UT). Redispersion was performed for 30 minutes. The resulting dispersion has a solid content of 24 wt. %. No further increase in the solid content was possible. As a result of the high viscosity, this dispersion was unsuitable for the production of coating compositions.

Dispersion 5 (D5): Aerosil® 90, colloidal silica (Ludox®)

A small quantity of KOH was dissolved in 525 g water to establish a pH of 11.0. 225 g of Aerosil® 90 were then introduced under shear conditions (UT) and redispersion was performed for 30 minutes. A dispersion with a solid content of 30 wt. %, a pH of 9.5 and a zeta potential of −41 mV was obtained. The aggregate size was determined to be 170 nm.

A colloidal silica (Silica Ludox®, DuPont) can be obtained in the form of a 50 percent aqueous dispersion with a pH of 9.5, a zeta potential of −38 mV, and a particle size of 25 nm.

A 1:1 mixture of the two dispersions was produced, which has a solid content of 40 wt. % and a pH of 9.5. A bimodal distribution was obtained by particle size analysis with peaks at 29 nm and 168 nm.

Dispersion 6 (D6): Aerosil® 50, Aerosil® 200 and cationic polymer

Similar to D4 except that 1025 g water, 25.0 g Polyquat, 112.5 g Aerosil® 300 and 337.5 g Aerosil® OX50 were used. The resulting solid content was 30 wt. %.

Dispersion 7 (D7): Aerosil® 130, Aerosil® OX50 and cationic polymer

Similar to D4 except that 1033 g water, 17.3 g Polyquat, 150 g Aerosil® 130 and 300 g Aerosil® OX50 were used. The resulting solid content was 30 wt. %.

Dispersion 8 (D8): Aerosil® 200, Aerosil® OX50 and cationic polymer

Similar to D4 except that 1027.5 g water, 22.5 g Polyquat, 150 g Aerosil® 200 and 300 g Aerosil® OX50 were used. The resulting solid content was 30 wt. %.

Dispersion 9 (D9): Aerosil® 380, Aerosil® 200, Aerosil® OX50 and cationic polymer Similar to D4 except that 1021 g water, 28.8 g Polyquat, 46 g Aerosil® 380 and, 104 g Aerosil® 200 and 300 g Aerosil® OX50 were used. The resulting solid content was 30 wt. %.

Dispersion 10 (D10): VP Alu 1 and VP Alu 130

8 kg of VP Alu 1 were first introduced into 23.9 kg of water through the suction pipe of a Conti-TDS. The pH was adjusted to pH 4.5 by addition of semi-concentrated acetic acid. 8 kg of VP Alu 130 were then introduced through the suction pipe of the Conti-TDS. The resulting solid content was 40 wt. %.

Dispersion 11 (D11): Aerosil® OX50, Aerosil® 300, cationic polymer 1.8 kg of Polyquat were dissolved in 34 kg of water and then 8.8 kg of Aerosil® OX50 were metered in through the suction pipe of a Conti-TDS. A total of 10.45 kg of Aerosil® 300 was then added in the same manner. Thereafter, 4 kg the wet jet mill was connected in parallel at 1000 bar as an additional shearing unit to further increase the increasing viscosity. Shearing was then continued for an additional 15 minutes in the same way. The resulting solid content was 35 wt. %.

Dispersion 12 (D12): VP Alu 1, Aerosil® 300 and cationic polymer

Similar to D4 except that 951.5 g water, 23.5 g Polyquat, 300 g VP Alu 1 and 225 g Aerosil® 300 were used. The resulting solid content was 35 wt. %.

The examples show that the dispersions D5 to D11 according to the present invention result in a low viscosity with a high solid content (see Table 2). In contrast, comparative examples D1 to D4 result in a significantly higher viscosity with a lower solid content. D1, D3 and D4 were unsuitable for the production of coating compositions, while D2 was only of limited suitability.

Dispersions D13 to D20 contain mixed oxide powders. The analytical data for these dispersions was reproduced in Table 3.

Dispersion 13 (D13): DOX 110, AE 380, cationic polymer

Dispersion 13A (D13A)

1.38 kg of Polyquat were dissolved in 35 kg of water and a total of 36.5 kg of DOX 110 was introduced through the suction pipe of a Conti-TDS within 45 minutes. A stable dispersion was obtained with a solid content of 50% at pH 2.96. The aggregate size was 113 nm.

Dispersion 13B (D13B)

57.0 g of Polyquat were dissolved in 1143 g of water and a total of 300 g of Aerosil® 380 was introduced under shear conditions (UT). Redispersion was performed for 30 min and a 20% dispersion, pH 2.94, was obtained. The aggregate size was 163 nm.

Dispersion 13 (D13)

Dispersions D13A and D13B were mixed together in various ratios to produce a sample bottle containing a total of 100 g of a mixed dispersion. The bottle was shaken vigorously for one minute, allowed to rest for one hour and the viscosities were subsequently determined.

Figure 3:
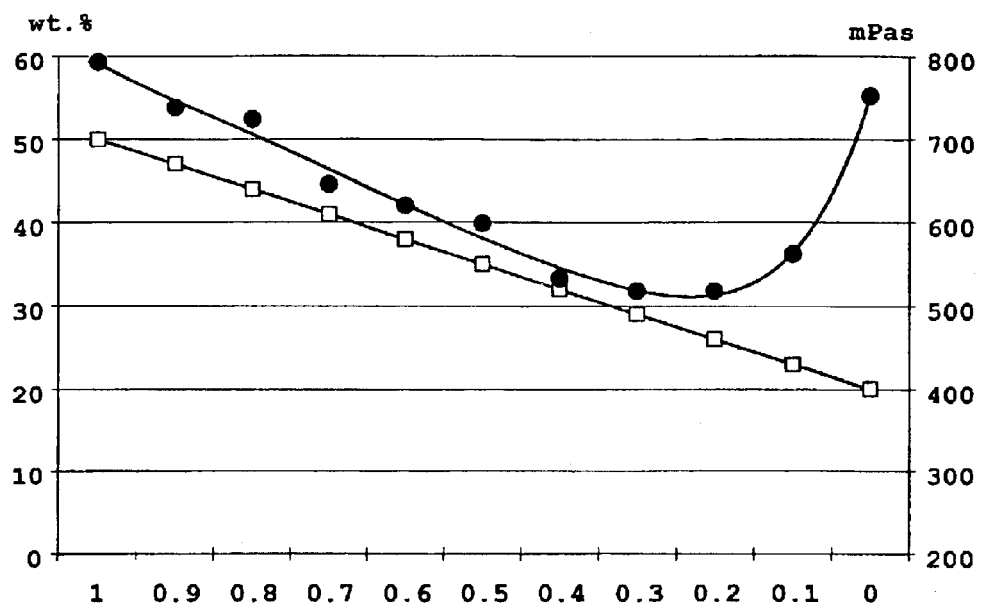
FIG. 3 shows the dependency of the solid content in wt. % in dispersion D13, indicated by □, and the viscosity in mPas, indicated by •, on the content of mixed oxide, relative to the sum of DOX 110 and AE 380. 1" accordingly corresponds to the situation where only DOX 110 is contained as solid in the dispersion and "0" corresponds to the situation where only AE 380 is present.

The analytical values for these dispersions are reproduced in Table 4 and FIG. 3. FIG. 3 shows the dependency of the solid content in wt. % in the dispersion, indicated by □, and the viscosity in mPas, indicated by •, on the content of mixed oxide, relative to the sum of DOX 110 and AE 380. "1" accordingly corresponds to the situation where only DOX 110 was contained as solid in the dispersion and "0" corresponds to the situation where only AE 380 was present.

It can be seen that all mixtures have a lower viscosity than the two starting dispersions with a minimum at around 30 wt. % solid content and an average BET surface area of approximately 200 m$^2$/g.

Dispersion 14 (D14): DOX 110, AE 300, cationic polymer
Similar to D4 except that 1022 g water, 28.0 g Polyquat, 112.5 g Aerosil® 300 and 337.5 g DOX 110 were used. The resulting solid content was 30 wt. %.

Dispersion 15 (D15): DOX 110, MOX 300, cationic polymer
Similar to D14 except that MOX 300 was used in place of Aerosil® 300. The resulting solid content was 30 wt. %.

Dispersion 16 (D16): MOX 170, DOX 110, cationic polymer
Similar to D4 except that 942 g water, 33.0 g Polyquat, 300 g MOX 170 and 225 g DOX 110 were used. The resulting solid content was 30 wt. %.

Dispersion 17 (D17): DOX 110, AE 200, cationic polymer
Similar to D4 except that 1021 g water, 28.8 g Polyquat, 46 g Aerosil® 380 and, 104 g Aerosil® 200 and 300 g DOX 110 were used. The resulting solid content was 30 wt. %.

Dispersion 18 (D18): DOX 110, AE 380, cationic polymer

Dispersion 18A (D18A)
2 kg of Polyquat were dissolved in 42 kg of water. Then 9 kg of DOX 110 and 9 kg of Aerosil® 380 were introduced through the suction pipe of a Conti-TDS. A 30% dispersion was obtained.

Dispersion 18B (D18B)
50 kg of dispersion D18A were sheared with the aid of the wet jet mill in a total of 5 passes at 2500 bar. The viscosity decreases during this process from an initial value of 180 mPas to 9 mPas.

Dispersion D18C (D18C)
An additional 2 kg of Polyquat were dissolved in 40 kg of dispersion D18B. In a circulatory operation an additional 7 kg of DOX 110 and 7 kg of Aerosil® 380 were subsequently sucked into the dispersion with constant shearing by means of a Conti-TDS and wet jet mill at 2500 bar. The resulting solid content was 46.5 wt. %.

Dispersion 19 (D19): DOX 110, AE 300, cationic polymer
Similar to D18A except that 6 kg of DOX 110 and 12 kg of Aerosil® 300 were used, such that a solid content of 30 wt. % was obtained.

Dispersion 20 (D20): DOX 110, AE 200, cationic polymer
Similar to D19 except that Aerosil® 200 was used in place of Aerosil® 300 and only 1.4 kg of Polyquat were used, to give rise to a dispersion with a solid content of 30 wt. %.

Coating compositions

Formulation

An aqueous polyvinyl alcohol solution (PVA Mowiol 40-88, Clariant) with a 12.33% solid content was placed in a beaker and a quantity of water added such that after addition of the dispersion D(n) a coating composition was obtained with the desired solid content. The particular dispersion was added to the combination of polyvinyl alcohol solution and water while stirring with a high-speed mixer disc at 500 revolutions per minute (rpm). Once the addition was completed stirring was continued for an additional 30 minutes at 500 revolutions per minute. The coating compositions were then deaerated with the aid of a desiccator and a water jet pump.

Coating compositions were produced starting from dispersions D2, D6, D10, D11, D18, D19 and D20. The coating compositions S(n) contain 100 parts of dispersion D(n), relative to the solids in the dispersion, and x parts of PVA Mowiol 40-88. The composition and analytical data for the coating compositions are presented in Table 5. Index A refers to the coating of films, index B to the coating of paper, both of which are described below.

From the data in Table 5, it is apparent from the viscosity values that the coating compositions S6-A,B, S10-A,B and S11-A,B obtained from dispersions D6, D10 and D11, respectively, have a lower viscosity and a higher solid content than S2-A,B obtained according to the prior art. S6-B displays a somewhat higher viscosity than S2-A, although its solid content is significantly higher.

Ink-Absorptive Media

The coating compositions with index A were applied with the aid of wet film spiral blades onto an untreated polyester film (Benn) with a thickness 100 micrometers. A hairdryer was used to dry the coating compositions on the polyester film. The rate of application of the coating compositions with index A that was obtained is 25 g/m$^2$.

The coated films were printed with an Epson Stylus Color 980 with the settings Photo Quality Glossy Film, 1440 dp, Epson calibration, gamma (D): 1.8 with an internal test image.

The coating compositions with index B were applied with the aid of wet film spiral blades onto a matt inkjet paper (Zweckform, no. 2576). A hairdryer was used to dry the coating compositions on the polyester film. The coated paper was then satinised under 10 bar of pressure and at 50° C. with the aid of a laboratory calender. The rate of application of the coating compositions with index B that was obtained is 13 g/m$^2$.

The coated papers were printed with an Epson Stylus Color 980 with the settings Premium Glossy Photo Paper, 1440 dpi, bidirectional, Epson calibration, gamma (D): 1.8 with an internal test image.

The visual impression of gloss, adhesion and test image for the ink-absorptive media produced is presented in Table 6. The absorptive media according to the prior art (M2-A,B) display good to satisfactory values for gloss and adhesion and even very good values for test image impression, but the drying performance was very poor. The media according to the present invention display good to very good values for gloss, adhesion and test print. The drying performance in the case of the absorptive media according to the present invention was clearly superior compared with the media according to the prior art.

Numerous modifications and variations on the present invention are possible in light of the above teachings. It is, therefore, to be understood that within the scope of the accompanying claims, the present invention may be practiced otherwise than as specifically described herein.

TABLE 1

Metal oxide/metaloid oxide powders used

| | BET surface area(*) [m$^2$/g] | Average primary particle diameter [nm] |
|---|---|---|
| Aerosil ® OX 50 | 50 | 40 |
| Aerosil ® 90 | 90 | 20 |
| Aerosil ® 130 | 130 | 16 |
| Aerosil ® 200 | 200 | 12 |
| Aerosil ® 300 | 300 | 7 |
| Aerosil ® 380 | 380 | 7 |
| VP Alu 130 | 130 | 14 |
| VP Alu 1 | 65 | 28 |
| DOX 110 (approx. 0.2% Al$_2$O$_3$) | 65 | 35 |
| MOX 170 (approx. 1% Al$_2$O$_3$) | 170 | 15 |
| MOX 300 (approx. 1% Al$_2$O$_3$) | 300 | 7 |
| Ludox ® | 100 | 25 |

*approximate values

TABLE 2

Analytical data for dispersions D1 to D12

| Dispersion | Powder proportions[1] | Primary particle diam. factor | Average aggregate diameter [nm] | Average BET surface area[2] [m²/g] | Solid content [wt. %] | pH | Viscosity mPas | Zeta potential [mV/pH] |
|---|---|---|---|---|---|---|---|---|
| D1  | —       | —         | 348       | 200     | 18   | 2.95 | 3500 | n.d.    |
| D2  | —       | —         | 211       | 200     | 22.6 | 3.02 | 1300 | +39/4.5 |
| D3  | —       | —         | 258       | 130     | 26   | 2.87 | 4150 | n.d.    |
| D4  | 50:50   | 1.33      | 243       | 165     | 24   | 2.93 | 3780 | n.d.    |
| D5  | 50:50   | 1.25      | 29/168[4] | n.d.[3] | 40   | 9.50 | n.d. | n.d.    |
| D6  | 75:25   | 5.71      | 177       | 113     | 30   | 2.69 | 120  | +35/4.5 |
| D7  | 75:25   | 2.50      | 234       | 77      | 30   | 2.88 | 118  | +36/4.5 |
| D8  | 75:25   | 3.33      | 168       | 100     | 30   | 2.80 | 202  | +38/4.2 |
| D9  | 75:23:2 | 3.33/5.71 | 174       | 110     | 30   | 2.78 | 90   | +41/3.9 |
| D10 | 50:50   | 2         | 128       | 98      | 40   | 4.50 | 375  | +45/4.5 |
| D11 | 46:54   | 5.71      | 157       | 186     | 35   | 2.73 | 435  | +37/4.3 |
| D12 | 57:23   | 4         | 187       | 166     | 35   | 3.60 | 285  | +41/3.6 |

[1]Ratio calculated from the smaller to the larger BET surface area;
[2]calculated from BET values and solid content of the aggregate types;
[3]n.d. = not determined;
[4]bimodal distribution;

TABLE 3

Analytical data for dispersions D14 to D20

| Disp. | Proportions MOX:AE | Primary particle diam. factor | Average aggregate diameter [nm] | Average BET surface area[1] [m²/g] | Solid content [wt. %] | pH | Viscosity mPas[2] | Zeta potential [mV/pH] |
|---|---|---|---|---|---|---|---|---|
| D14  | 75:25     | 5      | 124 | 124 | 30   | 2.7  | 652  | +37/3.5 |
| D15  | 75:25     | 5      | 198 | 124 | 30   | 2.95 | 1100 | n.d.    |
| D16  | 57:43[3]  | 2.33   | 168 | 125 | 35   | 3.15 | 954  | +33/4.8 |
| D17  | 75:23:2   | 2.92/5 | 159 | 128 | 30   | 2.78 | 125  | +39/3.8 |
| D18A | 50:50     | 5      | 127 | 223 | 30   | 2.95 | 180  | +37/3.5 |
| D18B | 50:50     | 5      | 77  | 223 | 30   | 2.89 | 9    | n.d.    |
| D18C | 50:50     | 5      | 85  | 223 | 46.5 | 3.05 | 1450 | +36/3.1 |
| D19  | 25:75     | 5      | 109 | 222 | 30   | 2.89 | 500  | +38/2.9 |
| D20  | 25:75     | 2.92   | 110 | 155 | 30   | 2.93 | 280  | +37/3.8 |

[1]calculated from BET values and solid content of the aggregate types;
[2]at 12 s⁻¹;
[3]MOX170:DOX110

TABLE 4

Mixtures of DOX110 (D13A) and AE 380 (D13B)

| Ratio MOX:AE | Average BET surface area[1] [m²/g] | Solid content [wt. %] | Viscosity [mPas] |
|---|---|---|---|
| 1   | 65  | 50 | 793 |
| 0.9 | 78  | 47 | 738 |
| 0.8 | 94  | 44 | 724 |
| 0.7 | 111 | 41 | 646 |
| 0.6 | 131 | 38 | 620 |
| 0.5 | 155 | 35 | 599 |
| 0.4 | 183 | 32 | 533 |
| 0.3 | 217 | 29 | 518 |
| 0.2 | 259 | 26 | 518 |
| 0.1 | 312 | 23 | 562 |
| 0   | 380 | 20 | 752 |

[1]calculated from BET values and solid content of the aggregate types

TABLE 5

Coating compositions

| Coating composition | PVA content[1] | Solid content wt. % | pH | Viscosity[2] mPas |
|---|---|---|---|---|
| S2-A   | 28  | 14.5 | 3.5 | 584 |
| S2-B   | 12  | 17   | 3.3 | 676 |
| S6-A   | 18  | 18   | 3.3 | 464 |
| S6-B   | 5   | 22   | 3.1 | 608 |
| S10-A  | 16  | 28   | 4.9 | 282 |
| S10-B  | 5   | 32   | 4.8 | 312 |
| S11-A  | 21  | 20   | 3.3 | 490 |
| S11-B  | 6.5 | 24   | 3.1 | 620 |
| S18B-A | 21  | 21   | 3.3 | 454 |
| S18B-B | 6.5 | 25   | 3.1 | 590 |
| S19-A  | 23  | 18   | 3.5 | 568 |
| S19-B  | 6.5 | 24   | 3.3 | 646 |
| S20-A  | 18  | 18   | 3.5 | 464 |
| S20-B  | 6   | 25   | 3.3 | 578 |

[1]Relative to 100 parts of solids in the dispersion
[2]Brookfield viscosity at 100 rpm in mPas (cf. dispersion)

TABLE 6

Visual impression of gloss, adhesion and test image[1] on the ink-absorptive media.

| Ink-recording medium | Gloss | Adhesion of coating composition | Test print | Drying performance of coating composition |
|---|---|---|---|---|
| M2-A | + | 0 | ++ | − |
| M2-B | +/0 | +/0 | + | − |
| M6-A | +/0 | + | + | 0 |
| M6-B | 0 | ++ | + | +/0 |
| M10-A | + | + | + | ++ |
| M10-B | +/0 | ++ | + | ++ |
| M11-A | ++ | + | + | + |
| M11-B | + | ++ | ++/+ | + |
| M18B-A | ++ | + | 0 | 0 |
| M18B-B | + | + | + | + |
| M19-A | + | +/0 | + | − |
| M19-B | +/0 | ++ | ++/+ | + |
| M20-A | + | + | + | − |
| M20-B | +/0 | + | ++ | + |

[1]Each test impression assessed by 3 independent people:
++: very good,
+: good,
+/0: good to satisfactory,
0: satisfactory;
−: poor;
−−: very poor

What we claim is:

1. A stable, aqueous dispersion comprising 20 to 80 wt. %, relative to the total amount of dispersion, of one or more metal oxide powders and/or one or more non-metal oxide powders,
  wherein said metal oxide powders and/or non-metal oxide powders are in the form of aggregates of primary particles,
    whereby the average diameter of the aggregates is 10 nm to 300 nm and
    the average diameter of the primary particles is 5 to 50 nm,
wherein
  the dispersion comprises at least two types of powder,
    wherein the powder types at a given pH of the dispersion display the same surface charge and
    have a zeta potential that gives rise to an electrostatic repulsion between the particles that is greater than the van der Waals attraction between the powders and
  the average diameters of the primary particles differ by a factor of at least 1.5 between two powder types and
  in the dispersion the average aggregate diameter of the second and additional powder types is 60 to 150% of the size of the first powder type and
  each powder type is present in the dispersion in a quantity of at least 1 wt. %.

2. The dispersion according to claim 1, wherein two types of powder are present.

3. The dispersion according to claim 1, wherein the weight ratio of the first powder type to the second powder type is 10:90 to 90:10.

4. The dispersion according to claim 1, wherein the average primary particle diameters of the powder types differ by a factor of at least 2.

5. The dispersion according to claim 1, wherein the average aggregate diameter of the second and additional powder types is 80 to 120% of the size of the first powder type.

6. The dispersion according to claim 1, wherein the powder types are produced by flame hydrolysis.

7. The dispersion according to claim 1, wherein the powder type is silicon dioxide in a cationised form, which is produced by flame hydrolysis.

8. The dispersion according to claim 1, wherein at least one powder type is a mixed oxide powder.

9. The dispersion according to claim 8, wherein the mixed oxide powder is a powder produced by flame hydrolysis.

10. The dispersion according to claim 1, wherein the viscosity of the dispersion does not exceed a value of 1500 mPas at a shear rate of 12 s$^{-1}$ and a temperature of 23° C.

11. The dispersion according to claim 1, further comprising one or more substances to adjust the pH.

12. The dispersion according to claim 11, wherein said substance is selected from the group consisting of an acid, a base, and a buffer system.

13. The dispersion according to claim 1, further comprising one or more additives selected from the group consisting of a salt, a surface-active substance, an organic solvent, a bactericide and a fungicide.

14. A process for the production of the dispersion according to claim 1, comprising:
  separately dispersing one or more metal oxide powders and/or one or more non-metal oxide powders in an aqueous medium by means of a dispersing device and combining the powders.

15. A process for the production of the dispersion according to claim 1, comprising:
  mixing one or more metal oxide powders and/or one or more non-metal oxide powders, and
  dispersing the mixture of powders.

16. A process for the production of the dispersion according to claim 1, comprising:
  introducing one or more metal oxide powders and/or one or more non-metal oxide powders in portions into a dispersing device to obtain a powder mixture, and
  dispersing the powder mixture.

17. A coating composition, comprising the dispersion according to claim 1 and at least one hydrophilic binder.

18. The coating composition according to claim 17, wherein the content of the powders from the dispersion is 10 to 60 wt. % with respect to the total of the coating composition.

19. The coating composition according to claim 17, wherein the content of the hydrophilic binder, relative to the powders from the dispersion, is 3 to 150 wt %.

20. A recording medium, comprising the coating composition according to claim 17 and a support.

21. A process for the production of a recording medium, comprising:
  applying the coating composition according to claim 17 to a support, and
  drying said coating composition on said support.

22. A process for the production of a coating composition, comprising:
  stirring a dispersion according to claim 1 into an aqueous solution containing a hydrophilic binder.

23. The process of claim 22, further comprising adding to the coating composition one or more additives selected from the group consisting of pigments, cross-linking agents, optical brighteners, defoaming agents, wetting agents, pH buffers, UV absorbers and viscosity aids.

* * * * *